Dec. 26, 1950  C. E. LINDEN ET AL  2,536,006
INTERLOCKED CONTROL FOR THE CLAMPS AND SPINDLE
OF A RADIAL DRILL OR THE LIKE
Filed July 23, 1948  7 Sheets-Sheet 3

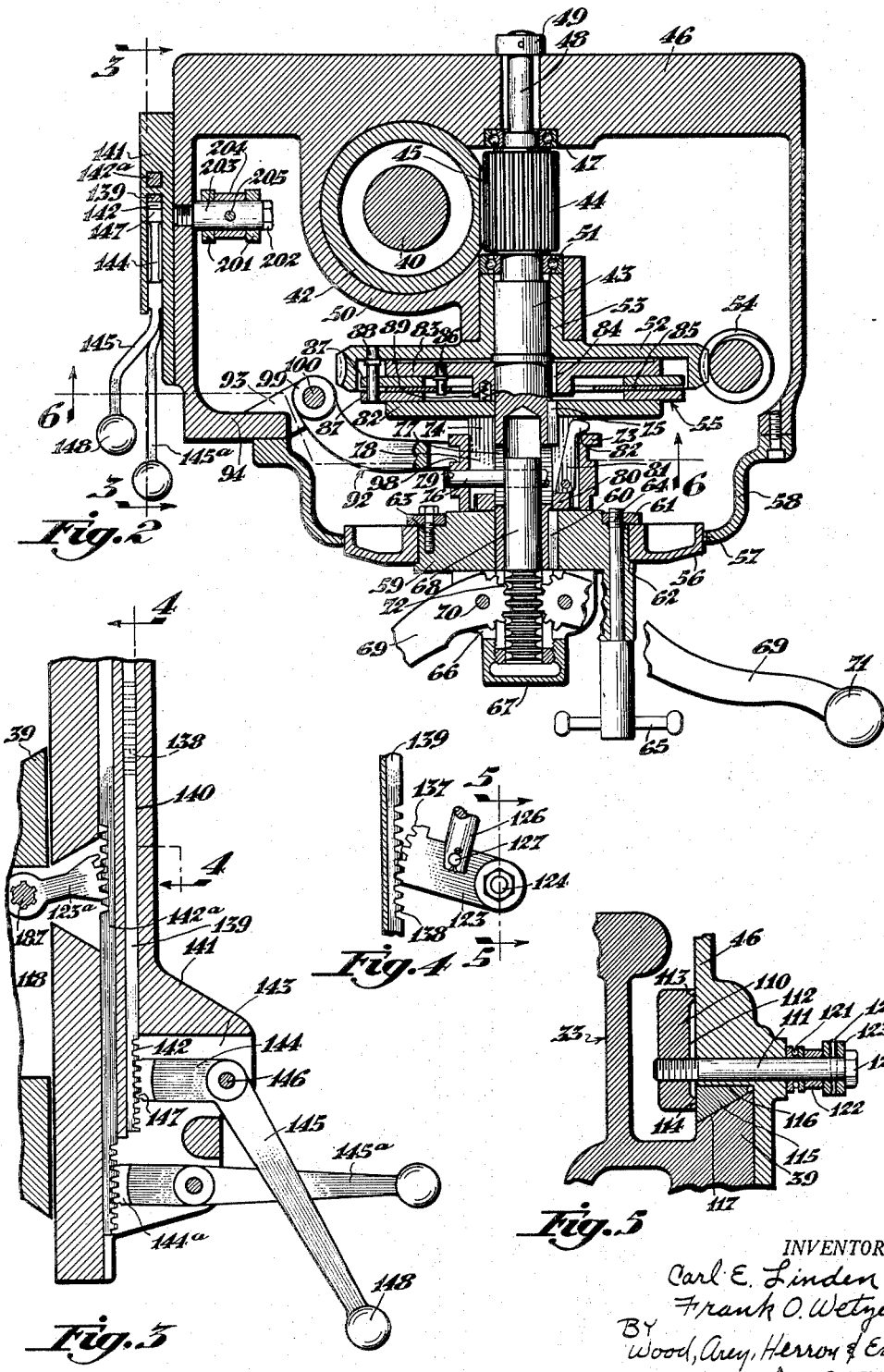

INVENTORS.
Carl E. Linden
Frank O. Wetzel
BY
Wood, Arey, Herron & Evans
ATTORNEYS.

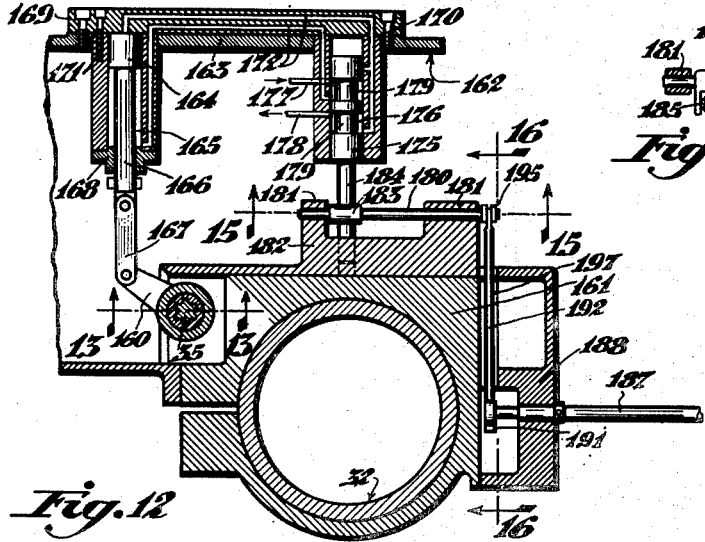
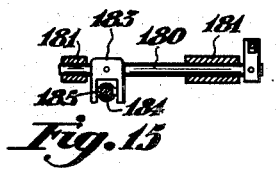
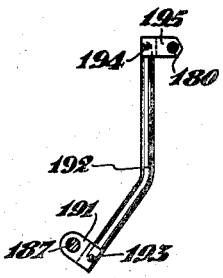
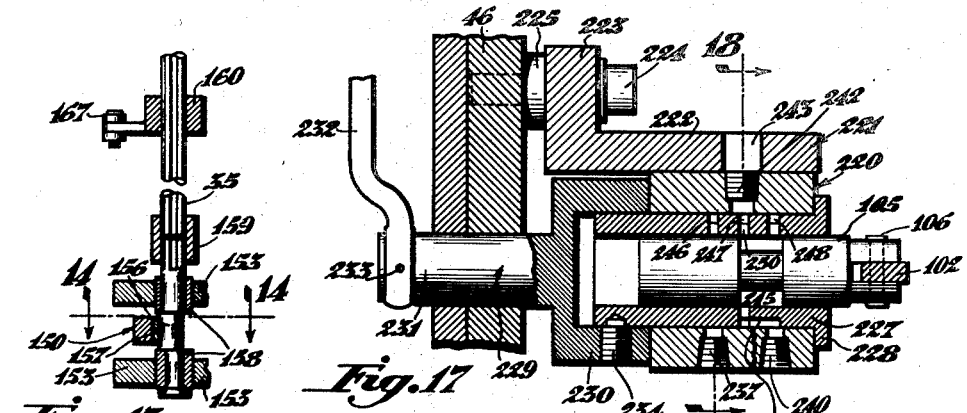
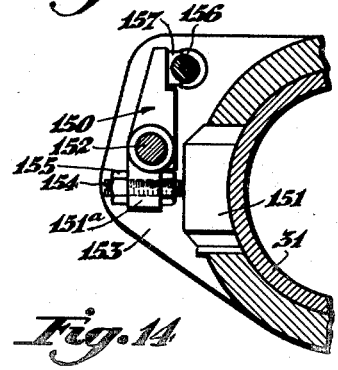
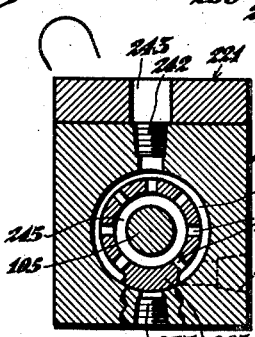
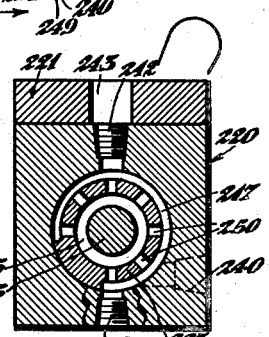

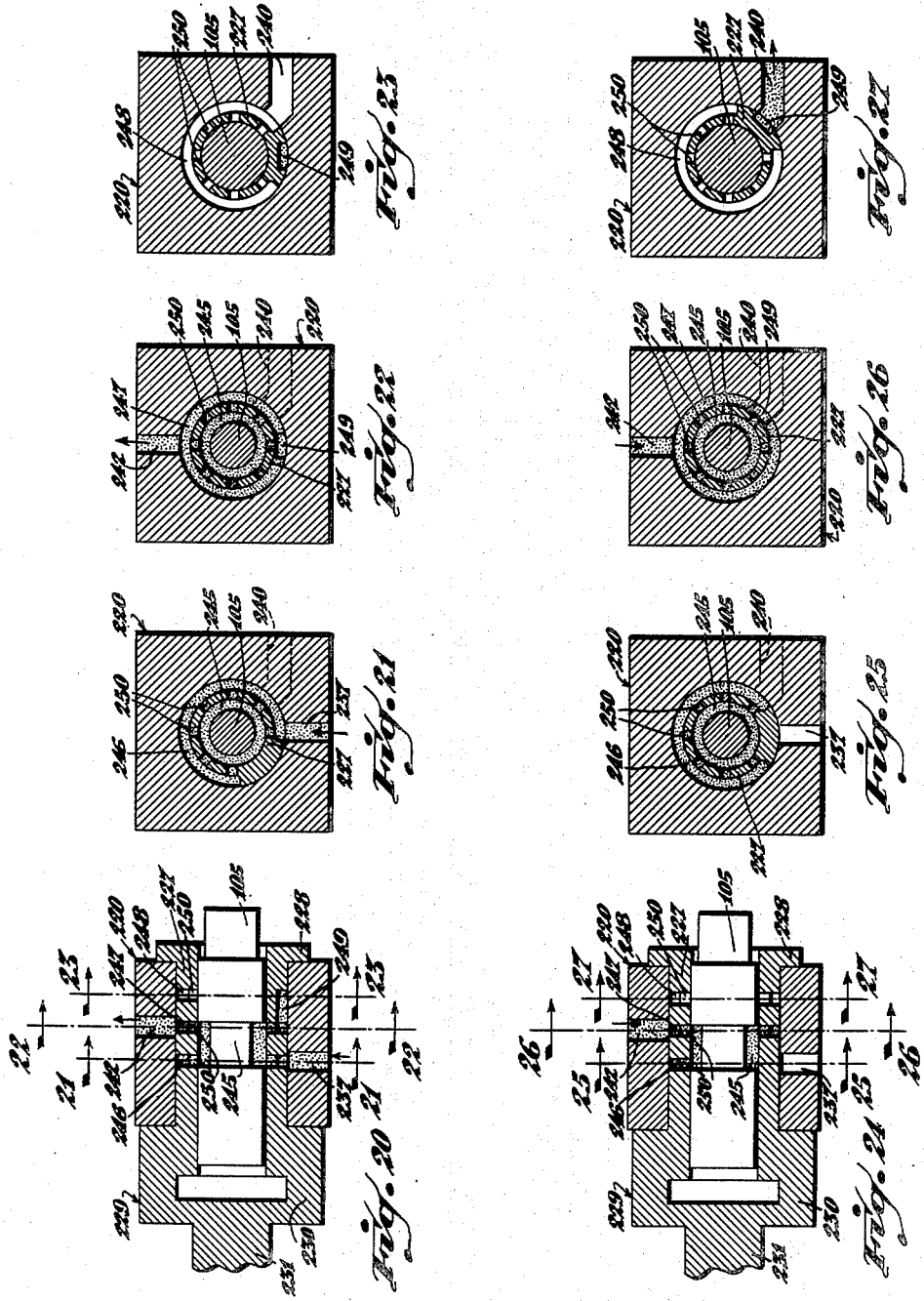

Patented Dec. 26, 1950

2,536,006

UNITED STATES PATENT OFFICE 2,536,006

INTERLOCKED CONTROL FOR THE CLAMPS AND SPINDLE OF A RADIAL DRILL OR THE LIKE

Carl E. Linden, Cincinnati, and Frank O. Wetzel, Norwood, Ohio, assignors to The Fosdick Machine Tool Company, Cincinnati, Ohio, a corporation of Ohio Application July 23, 1948, Serial No. 40,297

4 Claims. (Cl. 77—28)

This invention relates to machine tools for drilling or tapping, and is particularly directed to improvements in the controls for the head and column clamps of that type of machine tool embodying a drill head adjustable on an arm and the arm carried for vertical adjustment on a rotatively mounted column.

In this type of machine tool, the drill or tap is rotatively and translatably mounted within the drill head. Power means is provided for rotating and translating the tool spindle. Also, hand levers are provided which are effective for controlling the connection of the power to the spindle for the translative motion thereof. The head is adjustable horizontally on the arm and is fixed relative to the arm in the desired position relative to the work by means of a clamp. The column, which supports the arm for vertical adjustment thereon, also includes a clamping means effective for fixing the column against rotative motion during the drilling operation.

The tool is located relative to the work by swinging the arm and thus the column on the stump or base of the drill and by adjusting the drill head along the horizontal ways of the arm. After the drill has been accurately positioned for the drilling operation, it is naturally vital that there be no disturbance of this relationship and that the drill head of the arm and column be firmly locked against movement of any sort.

It has been the object of the present inventors to provide an interlock mechanism which is effective for automatically clamping the drill head and the column when the power feed is connected to the drill spindle, thus assuring the operator that the tool will perform the operation on the work in an accurate manner.

Further, it has been the object of the present inventors to provide an interlock mechanism of this type in which the hand levers, which normally connect the power to the drill spindle, are effective for controlling the operation of the clamps.

Preferably and as shown herein, it is desirable to have the main control levers effective for operating the respective clamps hydraulically, that is to say, to have the hand levers actuate a valve which controls the circuits to fluid motors for the respective clamps.

It has been a still further object to provide means whereby the main control valve may be placed in position where the interlock mechanism is ineffective whereupon the control levers for the spindle feed clutch may be moved in or out without hydraulically locking either the head or column, but in which event, either of these clamps may be set by means of hand levers.

It has been a still further object of the present inventors to provide, in accordance with the above recited improvement, an arrangement whereby the spindle may be rigidly located when the power feed is used and which will be effective for maintaining the spindle in such position, that is, for maintaining the clamps in locked position even after the spindle feed clutch is released or until either or both clamps are released by means of hand levers.

It has been a still further object of the present inventors to provide interlock apparatus of this type which is effective for connecting the power feed to the drill spindle and clamping the head and column in position through the use of a single leverage mechanism located conveniently at the front of the drill head.

Other objects and certain advantages of the invention will be more fully apparent from the following description of the drawings in which:

Figure 2 is a sectional view taken through the drill head on line 2—2, Figure 1, and illustrating the drill feeding mechanism and controls therefor, the section being quartered to illustrate the parts in a common plane.

Figure 3 is a fragmentary sectional view taken on line 3—3, Figure 2, detailing the levers and operating mechanisms for manually actuating the column clamp and the head clamp.

Figure 4 is a sectional view taken on line 4—4, Figure 3, showing in fragmentary detail the connection between the rack and the head clamp screw shaft.

Figure 5 is a fragmentary sectional view taken through the head clamp operating screw shaft somewhat along the line of section 5—5, Figure 4.

Figure 12 is a fragmentary sectional view taken generally on line 12—12, Figure 1, illustrating the hydraulic mechanism mounted adjacent the column for operating the column clamp shaft.

Figure 13 is a fragmentary sectional view taken on line 13—13, Figure 12, detailing the mounting for the vertical column clamp operating shaft and showing the connections thereto.

Figure 14 is a fragmentary sectional view taken on line 14—14, Figure 13, detailing the column clamp.

Figure 15 is a sectional view taken on line 15—15, Figure 12, showing a portion of the linkage from a shaft extending along the arm to the control valve for the column clamp operating piston and cylinder.

Figure 16 is a sectional view taken on line 16—16, Figure 12, showing the connecting link between the shaft extending along the arm and the valve operating shaft illustrated in Figure 15.

Figure 17 is a fragmentary sectional view taken longitudinally and axially through the control valve for the hydraulic piston and cylinders for the head clamp and column clamp, the view showing the valve in position when the drill spindle is not being fed and the valve is not effective for operating the clamps for the head and column.

Figure 18 is a sectional view taken on line 18—18, Figure 17, showing the valve shifted to "off" position and the main control valve plunger therefor ineffective for operating the clamps even though the plunger has been shifted as the power has been connected to the drill spindle.

Figure 19 is a view taken similar to Figure 18, but showing the valve shifted to "on" position, whereby the main control valve plunger is effective for operating the clamps hydraulically in the normal operation.

Figure 20 is a diagrammatic view taken the same as Figure 17, showing the valve in "on" position with the valve plunger shifted to direct the fluid to the respective cylinders for actuating the head and column clamps.

Figure 21 is a diagrammatic sectional view taken on line 21—21, Figure 20, illustrating the flow of fluid from the pump into the valve.

Figure 22 is a diagrammatic sectional view taken on line 22—22, Figure 20, illustrating the flow of fluid into the conduit leading to the clamp operating pistons and cylinders.

Figure 23 is a diagrammatic sectional view taken on line 23—23, Figure 20, illustrating the discharge or outlet port which is not in use at this position.

Figure 24 is a diagrammatic sectional view taken the same as Figure 20, but showing the valve in "off" position with the flow of fluid to the cylinder blocked so as to render the translation of the valve plunger ineffective for actuating the clamp.

Figure 25 is a diagrammatic sectional view taken on line 25—25, Figure 24, showing the fluid inlet side blocked.

Figure 26 is a diagrammatic sectional view taken on line 26—26, Figure 24, showing the passage of fluid from the cylinders into the valve.

Figure 27 is a diagrammatic sectional view taken on line 27—27, Figure 24, showing the discharge or return of the fluid.

Figure 1:
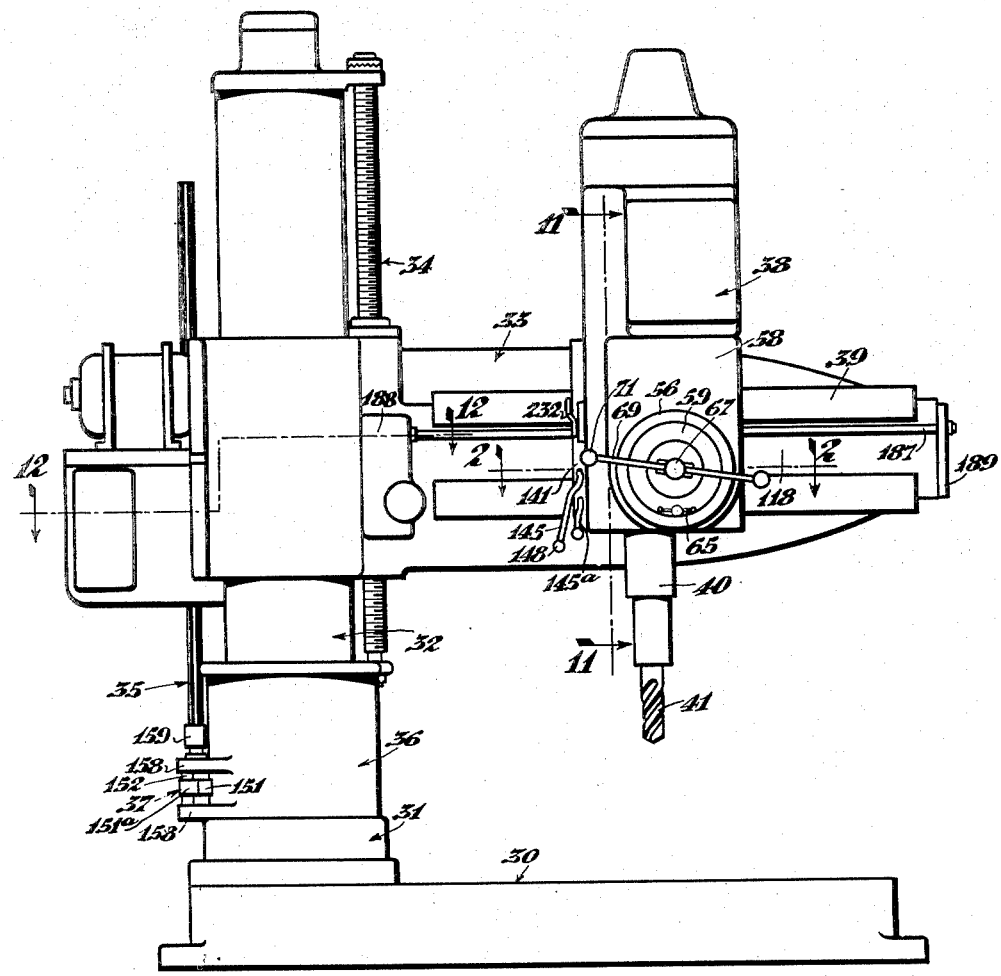
Figure 1 is a general view looking at the front of a radial drill incorporating the present improvements.

Referring to the drawings, particularly Figure 1, a radial drill is disclosed, the various features of this invention being incorporated therein. The base of the radial drill is generally indicated at 30. A stump 31 carries the column 32 for rotative adjustment thereon. The arm 33 is rotatively mounted on the column and is moved to selected positions of vertical adjustment by means of an elevating screw 34. The elevating screw is operated by mechanism not shown for sliding the arm up and down on the column. The column clamp shaft is generally indicated at 35, and extends to the base 36 of the column for operating a column clamp 37. The drill head 38 is mounted on a way 39 formed horizontally along the front face of the arm. A drill spindle 40 is mounted vertically in the head and carries a drill 41.

Drill spindle feeding mechanism

Referring to Figure 2, a drill spindle sleeve is shown at 42. A shaft 43 is mounted horizontally in the forward casing of the drill head and carries a rack gear 44 engaging rack teeth 45 formed along one side of the drill spindle sleeve, thus providing for the transmission of raising and lowering movement to the drill spindle sleeve.

The shaft 43 is journalled in the rear wall 46 of the drill head in a ball bearing 47. It includes a counterturned reduced diameter portion 48 extended through a bore in the wall 46. A collar 49 is pinned to the outer end of the shaft portion 48 lying against the back wall. The drill head includes an internal bearing boss 50 which houses the drill spindle sleeve and provides further bearing for the shaft 43, an additional ball bearing 51 being provided adjacent the front end of the pinion 44 for supporting the shaft in the boss 50. A worm gear 52 includes a bearing portion 53 disposed in the boss 50 and traversed by the shaft 43. This gear is loosely mounted on the shaft within the boss. It is driven by means of a worm 54 extended from the power source for the machine. It is not believed necessary to describe or illustrate in detail the transmission of power to the worm 54, or describe in detail the construction of the drill spindle assembly since these mechanisms may be conventional.

A clutch, generally indicated at 55, is provided for connecting the worm wheel 52 to the shaft 43, in other words, for instituting power drive for feeding the drill spindle. The forward end of the drive shaft 43 carries a dial 56. The dial element 56 is fitted loosely within an aperture 57 in the face plate or front cover 58 of the drill head. It is rotatively adjustably mounted on a plate 59 which is keyed to the shaft 43 by means of a key 60. A clamp ring 61 is disposed in an annular groove in back of the plate 59 and is adapted to grip and lock the indicator dial 56 between the inner surface of the ring 61 and the shoulder 62 at the forward side of the plate.

Screws 63 secure the ring 61 to the plate 59. One of these screws extends through the plate from the front and is screwthreaded into the ring so as to enable clamping of the ring from the front of the drill head. This screw, indicated at 64, carries a handle 65 for rotation of the screw when it is desired to clamp and unclamp the indicator dial relative to the plate.

The shaft 43 extends forwardly beyond a forward boss 66 of the plate 59, and a cap member 67 is screwthreaded on the extended end of the shaft against the boss. The cap 67 provides clearance for axial translative movement of a clutch operating shaft 68 telescopically mounted within a bore in the forward end of the shaft 43. The boss 66 and the shaft 43 include slots which are diametrically aligned for containing the pivoted ends of the clutch control and spindle feeding hand levers 69—69. These levers are disposed on a diametric line, that is, extend radially on either side of the shaft and are mounted on pivot pins 70 fixed in the boss 66 and passing through the inner pivoted ends of the levers. The outer ends of the levers include manipulating knobs 71. The levers include segmental gear portions 72 which mesh with the opposite sides of the clutch operating shaft 68 within circular rack teeth formed in the end of the shaft. Inward and outward swinging movement of the levers will cause translation of the shaft 68, and through means subsequently described, will clutch and declutch the drill spindle feed mechanism.

A clutch operating sleeve 73 is slidably mounted on an actuator sleeve 74, this sleeve 74 being keyed to the shaft 43 by means of a key 75. A pin 76 is disposed diametrically through the clutch operating shaft 68 and is disposed through slots 77 and 78 of the shaft 43 and sleeve 74. The outer ends of this pin 76 are disposed in diametrically opposite bores in the clutch sleeve 73 and pins 79 prevent endwise displacement thereof. A thrust collar 80 lies between the sleeve 74 and the inner end of the bearing plate 59. Specifically, this thrust collar lies within an annular groove or counterbore in the outer end of the sleeve 74. Clutch actuating fingers 81 are pivotally mounted on pins disposed in slots corresponding to the slots 78 in the spacer sleeve traversed by the pin 76. These actuating fingers 81 extend within the grooves longitudinally thereof, their inner ends having camming engagement with the thrust collar 80 and their outer ends, indicated at 82, extending outwardly to overhang and engage the inner end of the clutch actuating sleeve.

The clutch itself includes a series of plates. The outer plates of the clutch, namely, 82 and 83, are keyed to the shaft 43 by means of keys 75 and 84. Three clutch discs are provided, there being an intermediate grip plate 85 which rotates normally with the clutch plate 83, being attached for rotation therewith by means of pins 86 projecting from the inner face of the clutch plate and traversing apertures in the clutch disc 85. The other two clutch discs 87—87 engaging respectively the opposite sides of the intermediate clutch disc are fixed for rotation with the worm gear 52 by means of pins 88 fixed in the worm gear and traversing apertures in the clutch discs 87—87.

The central bore of the clutch disc 85 is large enough to clear the hub of the plate 83 and the bores of the disc 87 are of diameters sufficient for clearing the pins 86 and yet to provide adequate gripping surfaces for engagement with the intermediate disc. A series of coil springs 89, under compresion between the bases of bores in the hub of the clutch plate 83 and the inner face of the clutch plate 82, normally hold the clutch plates apart for preventing clutching. However, when the levers 69 are operated for translating the clutch operating shaft 68, a translating motion is applied to the actuator sleeve through the fingers 82, the clutch plates are brought together into clutching contact, and the power drive is connected through from the worm wheel to the drill spindle.

*Interlock control valve operating mechanism*

Figure 6:
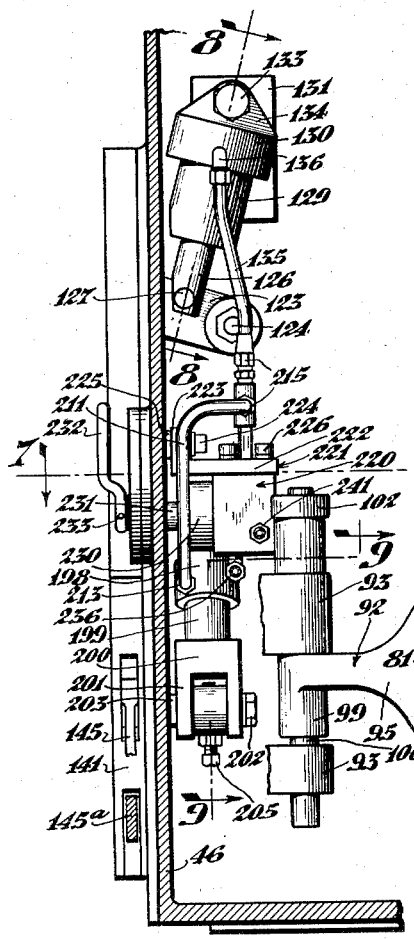
Figure 6 is a fragmentary sectional view taken on line 6—6, Figure 2, detailing the mechanism which extends from the drill feeding means for controlling the hydraulic circuits to the pistons and cylinders which operate the column clamp and the head clamp, the view further detailing the mounting of the aforesaid operating mechanisms within the head.

Referring to Figures 6, 7, 10 and 11, the main operating leverage between the clutch and the main control valve is generally indicated at 92. This lever is fulcrummed or pivotally mounted on a pair of vertically aligned bosses 93—93 projected inwardly from the forward wall 94 of the drill head casing. One arm 95 of the lever extends to the clutch sleeve 73 and provides a yoke 96, the arms of which straddle the clutch sleeve and include inward projections 97 disposed diametrically opposite and within an annular groove 98 in the clutch sleeve (Figure 6). The lever arm 95 includes a bearing lug 99 which is in the form of a sleeve and is traversed by a pivot shaft 100. The lug 99 is fixed to the shaft by means of a pin 101 (Figure 10) and is disposed between the bearing lugs 93.

A second lever arm 102 of the leverage 92 is fixed to the upper end of the shaft 100 by means of a pin 103 traversing the bearing lug of the lever. A spacer sleeve 104 spaces this lever 103 from the upper lug 93. The operating end of the lever arm 102 is pivotally attached to the valve plunger 105 of the main control valve by means of a pin 106. The connected end of the lever arm 102 fits in a slot (Figure 17) in the counterturned end of the valve plunger 105. The main control valve 107 controls the automatic hydraulic operation of the head clamp and the collar clamp coincident with the clutching of the power for feeding the spindle. Thus, these clamps are interlocked and may be positively set whenever the power is connected and the feeding operation of the drill spindle begins.

For ease of understanding of the structure in operation, it is believed clearer to describe the main valve or pilot valve after the clamping mechanisms and their alternately usable hydraulic controls and hand controls are described.

*Drill head clamp*

Referring to Figure 5, it will be noted that the clamping mechanism for the head consists primarily of a clamping shoe 110 and an operating screw shaft 111. As previously stated, the drill head is slidably mounted along the arm on the way 39. The back wall 46 of the forward drill head portion is shown and provides the mounting for the clamping mechanism. The clamping plate or shoe 110 has its inner face milled out as at 112 so as to provide upper and lower contact portions 113 and 114 respectively. The upper contact portion 113 engages the rear surface of the wall 46, and the lower portion 114 engages a wedge element 115 engaged between a horizontal shoulder 116 of the drill head and the inclined surface 117 of the way 39. Thus, when the clamping block is pulled toward the headstock, the effect is to wedge the element 115 into position on the dove-tailed way 39.

Figure 11:
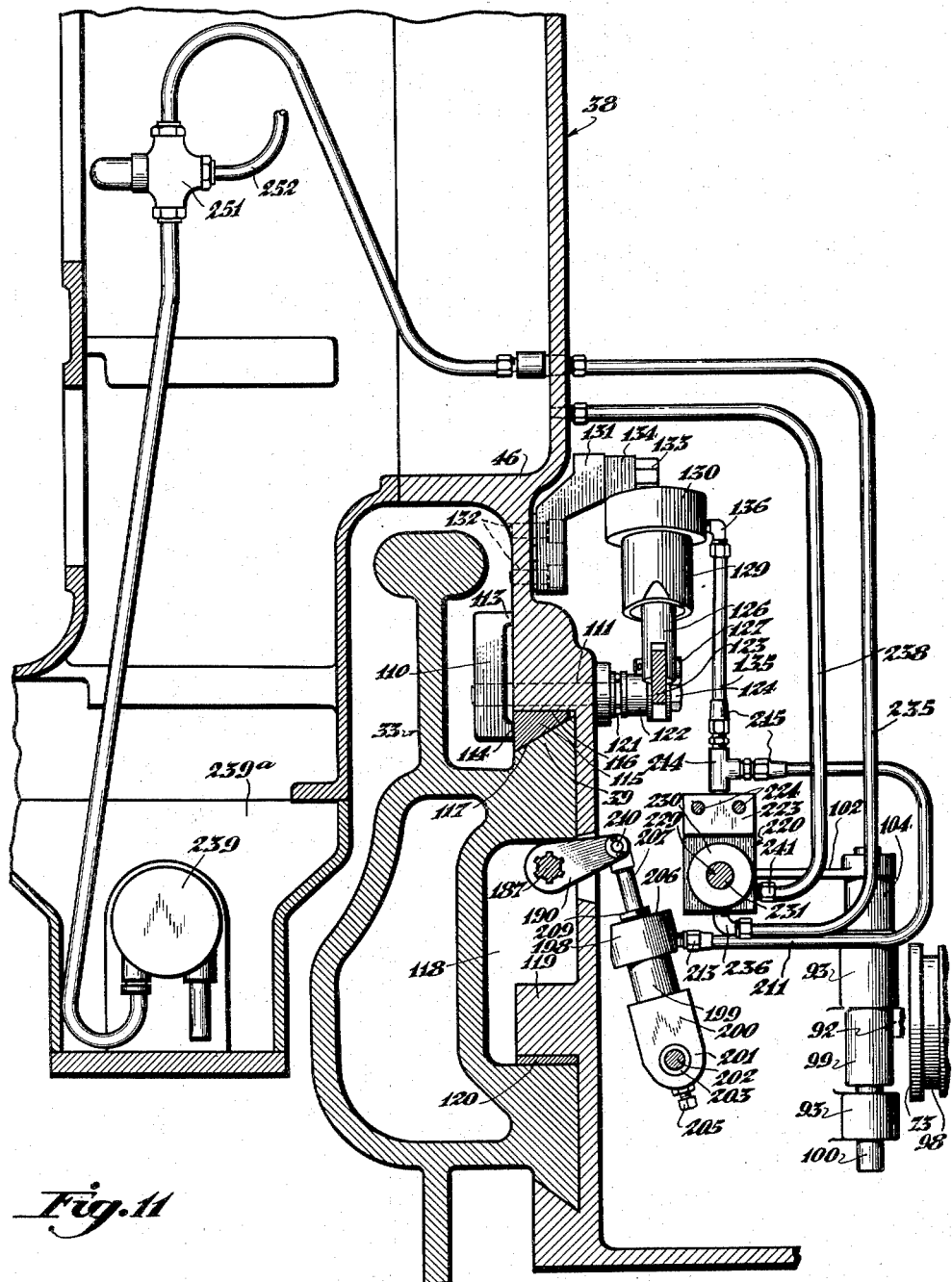
Figure 11 is a fragmentary sectional view taken on line 11—11, Figure 1, illustrating generally the entire hydraulic circuit.
Figure 28:
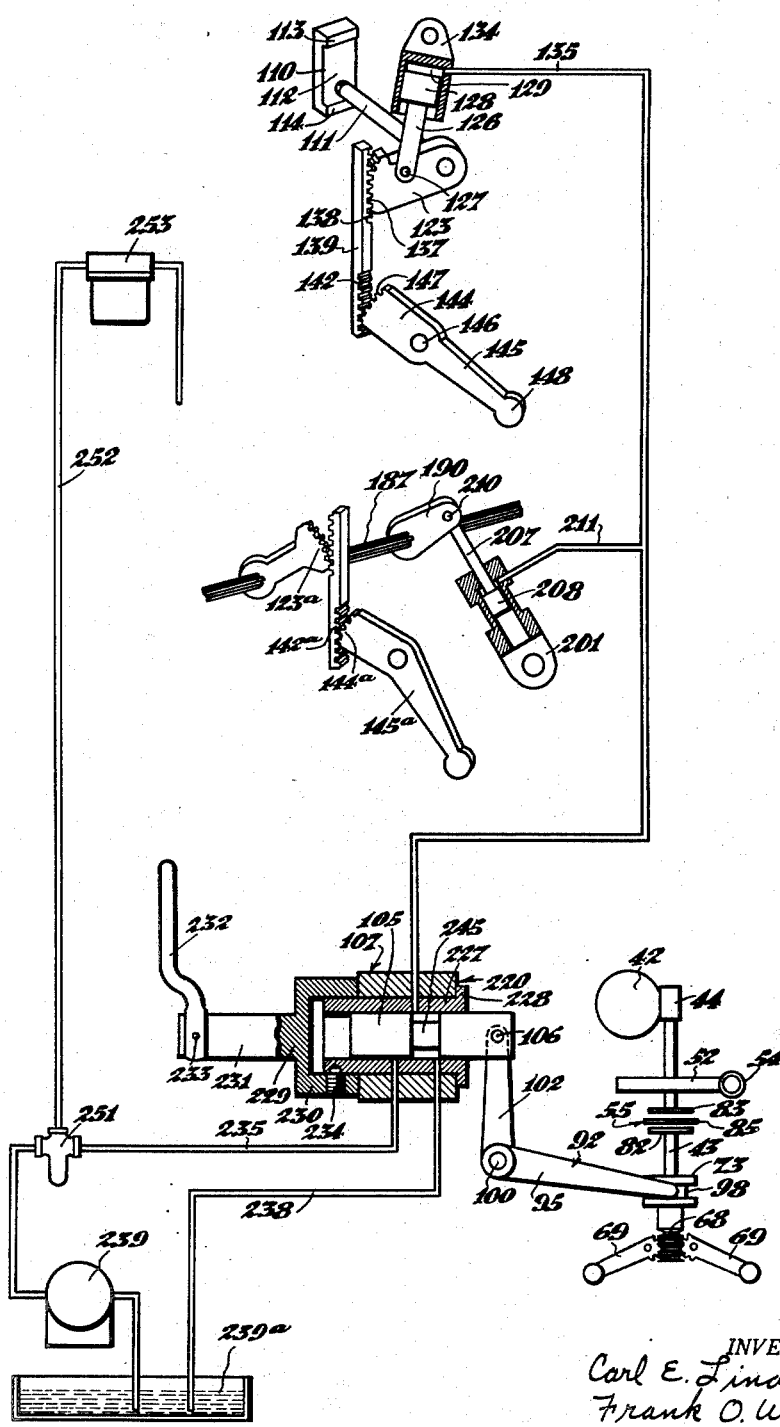
Figure 28 is a diagrammatic view illustrating the entire hydraulic circuit and showing the various mechanisms controlled thereby.

The lower surface of the dove-tailed way 39 is not shown in Figure 5, but will be apparent in Figures 1 and 11. The construction of the way for supporting the headstock will be readily understood from Figure 11. Its central portion is provided with a clearance 118 extending along the arm. Additional support for the head is provided by means of a longitudinal projection 119 overhanging the lower surface of the clearance 118. A bearing strip 120 is interposed between the projection 119 and the adjacent bearing surface of the arm.

The screw rod 111 includes a screwthreaded portion screwed into the clamping plate or shoe and a plain portion journalled through the drill head wall and extended into the interior of the drill head. An end thrust bearing 121 lies against the inner surface of the wall 46 about the screw rod and this in turn is engaged by means of a spacer sleeve 122 spacing the operating arm 123 from the bearing. The screw rod includes a head 124 lying against the connected end of the operating arm 123. The arm 123 is pinned to the screw rod by means of a pin 125. This operating arm, as shown in Figure 4, is provided with two means of operation, the one hydraulic and the other manual.

Figure 8:
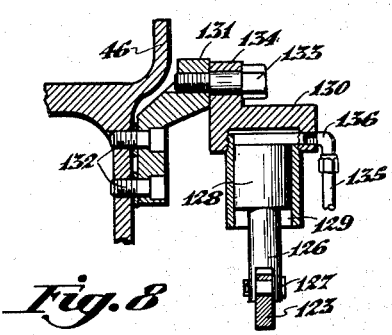
Figure 8 is a fragmentary sectional view taken on line 8—8, Figure 6, showing the details of the clamp operating hydraulic cylinder and piston.

The hydraulic means for causing rotation of the screw rod and clamping of the head consists of a piston rod 126 (Figures 4, 8 and 11) having a bifurcated end connected to an intermediate portion of the operating arm by means of a pin 127. The piston rod 126 includes a piston 128 (Figure 8) operating in a cylinder 129. The cylinder 129 is screwthreaded into a cylinder head 130, and the cylinder head is mounted for swinging movement on a hanger bracket 131 fixed to the wall 46 of the head. The bracket 131 is attached by screws 132, and the cylinder head is mounted thereon by means of a single pivot screw 133. The screw traverses a lug 134 on the cylinder head to provide a rotative bearing and includes a screw-threaded portion screwed into the supporting arm of the bracket 131.

A supply conduit 135 is connected to the cylinder head by means of screwthreaded nipple 136 for the purpose of delivering oil into the inner end of the cylinder through the cylinder head. Thus, the hydraulic piston and cylinder are free to swing on the pivot bolt 133 either during hydraulic or manual operation of the head clamp. In other words, the connection to the operating arm is entirely flexible. The conduit 135 extends directly to the main control valve 107 and the control of the hydraulic circuit will be described later.

To provide for manual operation of the head clamp, the outer end of the operating arm 123 includes rack teeth 137 meshing with the rack teeth 138 of a rack bar 139 (Figures 3 and 4). This rack bar is vertically slidably mounted in a vertical channel 140 in a lever control bracket 141 bolted to the side of the drill head (Figures 2 and 3). The bracket 141 consists of a flat plate-like structure. The lower end of the rack bar 139 includes rack teeth 142 in its forward side. This end of the rack bar is disposed within a clearance 143, the clearance containing the operating end 144 of a hand lever 145. This lever is pivoted on a pin 146 traversing the slot or clearance and fixed in the bracket. The end portion 144 includes rack teeth 147 meshing with teeth 142. The extended operating end of the lever 145 includes a ball grip 148 at its outer end.

In order to clear the associated lever which operates the column clamp (Figure 2), the lever 145 is bent outwardly away from the drill head and then forwardly to place its operating end in a plane separate from that of the column clamping lever.

Column clamping mechanism

Referring to Figures 1 and 12 to 16 inclusive, the column clamp is generally indicated at 150. The clamp consists of a clamping shoe 151 engaged against the side of the stump 31. This shoe is supported for radial movement relative to the stump and column in a slot or opening in the side of the base of the column 36. A clamping lever or arm 151a is mounted for pivotal movement in a horizontal plane on a vertically disposed pivot shaft 152. The pivot shaft is journalled in spaced lugs 153 projecting from the side of the column above and below the clamping shoe. The clamping lever is appropriately spaced between these lugs and carries an adjustable contact screw 154 in its outer end, the inner end of which engages the shoe, and the outer end of which carries a locking nut 155.

The other end of the lever 151a is actuated for the clamping operation by means of a cam portion 156 formed on the lower end of the vertical shaft 35. This cam portion engages an arcuate bearing plate 157 fastened to the end of the lever 151a. The shaft 35 is journalled in bearing bushings 158 in the lugs 153 (Figure 13). The shaft 35 is sectional, being joined by a coupling sleeve 159 near the lower end thereof. Further, it is splined and extends upwardly so as to traverse the arm in any adjusted position of the arm. The splined portion traverses the bearing portion of an arm 160 (Figure 12), the arm being disposed within the confines of the arm structure.

Only that much of the arm and related casings is shown which will make the construction of the arm clamping mechanism sufficiently clear for an understanding of the invention. The arm includes a portion 161 encircling the column. Attached to this is a casing structure 162 which supports the hydraulic elements and the linkages. In the outer wall 163 of this casing, the hydraulic piston 164 and cylinder 165 are mounted. The piston rod 166 is connected to the arm 160 by means of a link 167 to provide a flexible connection between these parts. The cylinder includes a head element 168 supporting the piston rod and has its other end closed by means of a channel plate 169 fixed to the outer surface of the casing 162 by means of screws 170. The cylinder is held in place in an aperture in the wall of the casing by means of screws 171 passing through the channel plate and into the cylinder wall.

Oil passageways enter the respective ends of the cylinder so as to translate the piston 164 for operating the clamp. These passageways are extended through the channel plate and are indicated at 172—172. The flow of oil through the respective passageways is controlled by means of a valve 175 mounted for translation in a cylinder 176. The cylinder 176 is mounted in the same manner as the cylinder 165 of the clamp operating piston and cylinder. The valve is adapted to control the oil from a pressure or supply line 177 to the clamp operating piston and cylinder. Also an exhaust or fluid return passageway 178 is provided, and the valve is arranged so as to alternately connect the supply line 177 and the return line 178 to the respective conduits 172.

In other words, in one position the valve will cause clamping of the clamp by moving the piston 164 to the position shown in Figure 12 at which time the passageway 172 entering the outer end of the cylinder is connected to the exhaust or return conduit 178. When the valve is moved to its other position, the situation is reversed, that is to say, the conduit 172 entering the outer end of the cylinder 165 becomes the supply conduit and the other passageway 172 is connected to the exhaust conduit 178. The connections are established for this purpose through a pair of annular grooves 179—179 formed in the valve, the arrangement being conventional in so far as the valve structure is concerned.

As indicated in Figure 15, a shaft 180 is journalled for rotation in lugs 181 formed as a part of a bracket 182 attached to the column. The shaft 180 carries a bifurcated arm 183. The bifurcations of this arm straddle the rod 184 of the valve 175 and include inwardly projected pins 185 lying within an annular groove in the valve stem or rod.

A rotatable rod 187 is journalled along the arm, its ends being respectively mounted in a bracket or casing 188 secured to the arm adjacent the column and a bearing bracket 189 at the outer end of the arm. This rod or shaft 187 extends through the clearance 118 along the front of the arm and is splined for sliding rotative connection to an operating arm 190 (Figures 3, 9 and 11) extended into the head. At the column end of the rod 187 (Figure 12), the rod is journalled, as stated, in the bracket or casing 188. Its end is disposed within a chamber in the element 188 and has an arm 191 (Figure 16) fixed thereto. This arm is bifurcated and is connected to a link 192, the end of the link being disposed between the bifurcations and pivotally mounted therein by means of a pin 193. The other end of the link is pivotally mounted on a pin 194 between the bifurcation of an arm 195 fixed to the outer end of the shaft 180. The link is disposed through a clearance 197 formed within the element 188. Thus, it will be apparent that rotation of the shaft or rod 187 will cause rotation of the shaft 180 and translation of the valve 175.

Figure 9:
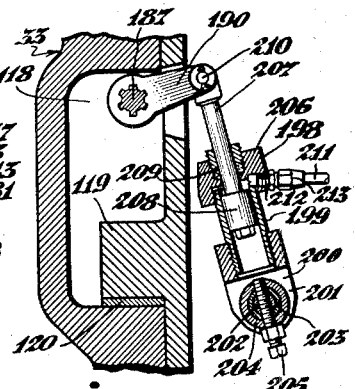
Figure 9 is a fragmentary sectional view taken on line 9—9, Figure 6, detailing the hydraulic piston and cylinder for operating the shaft extending to the column clamp.
Figure 7:
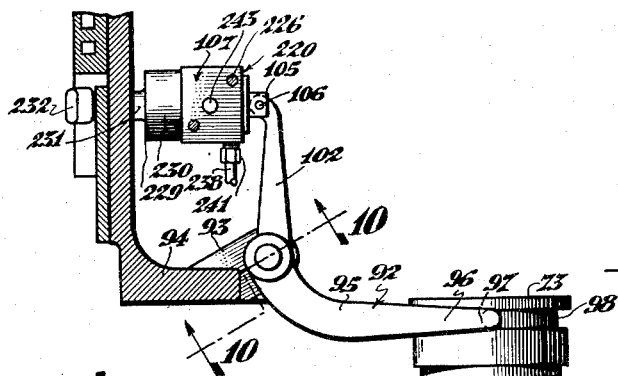
Figure 7 is a fragmentary sectional view taken on line 7—7, Figure 6, further illustrating the main or pilot control valve operating connection from the drill feed control mechanism to the valve.
Figure 10:
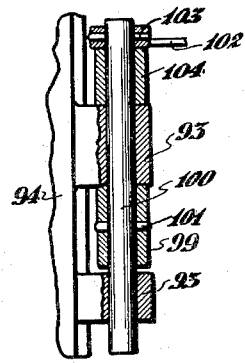
Figure 10 is a fragmentary sectional view taken on line 10—10, Figure 7, detailing the pivotal mounting of the operating lever which extends between the drill feed mechanism and the main control valve.

Actuation or rotation of the shaft 187 is accomplished by means of a hydraulic piston and cylinder unit indicated at 198 (Figure 9). The cylinder 199 has one end screwthreaded into a pivoted bracket 200. The member 200 is bifurcated, the arms 201 thereof being traversed by a mounting stud 202 fixed in the side wall of the drill head. The stud is screwthreaded (Figure 2) into the wall. A bearing sleeve 203 is disposed over the stud providing a spacer for the mounting stud relative to the wall of the drill head. An additional spacer sleeve 204 is mounted on the sleeve 203 between the arms of the bifurcated bracket. A screw 205 is disposed diametrically through the aforesaid assembly of the stud and sleeves and is locked in position by means of a lock nut. Thus, the bracket is free to pivot on the bearing sleeve 203.

The cylinder includes a cylinder head 206 at its other end. The piston rod 207 of the piston 208 traverses the head passing through a packing gland 209. The outer end of the piston rod includes a portion pivotally connected to the end of the arm 190 by means of a pivot pin 210. The supply conduit for the cylinder is indicated at 211 and is secured to the cylinder head by means of a nipple 212 and a coupling 213 and supplies fluid to the end of the cylinder for actuating the piston. The conduit 211 along with the conduit 135 of the head clamp is secured to the main or pilot valve through coupling means at the valve (Figure 11). A T-fitting is provided for this purpose indicated at 214. Appropriate coupling means 215 connect the conduit 135 and 211 to the T-shaped fitting which in turn is screwthreaded into the valve.

The column may be clamped or unclamped manually in the same manner as the drill head. For this purpose, a manually operated lever 145a is journalled adjacent the head control lever 145 (Figures 1 and 3). Lever 145a includes a gear segment 144a engaging a rack 142a. The upper end of this rack meshes with a gear segment 123a engaged on the splined shaft 187. By operation of lever 145a, the column may be clamped or unclamped independently of the hydraulic clamping system.

*Main control or pilot valve*

The main control or pilot valve is supported on the side wall of the drill head. The body of the valve, indicated at 220, is rectangular in cross-section (Figures 17, 18 and 19). It is mounted or supported on an angular bracket 221, this bracket including a horizontal portion 222 and a vertical angular portion 223. A pair of screws 224 pass through the vertical flange and are screwed into the side wall of the drill head. Spacer collars 225 space the bracket from the wall. A pair of screws 226 (Figure 6) fasten the body of the valve to the bracket.

The valve has two movements, one translative and the other rotative. Its main control movements, as operated from the spindle clutch, are effected by means of the valve plunger 105. The rotative movement, effecting control of the valve whereby the interlock is rendered ineffective, is applied to the sleeve or cylinder 227 within which the valve plunger is translatable.

The cylinder or sleeve 227 includes an annular flange or shoulder 228 at its outer end, this flange lying against the adjacent end of the body 220. An operating member 229 is attached to the other end of the cylinder or sleeve 227. The member 229 consists of a cup-like or sleeve portion 230 telescopically engaged over the projecting end of the sleeve 227 and a stud portion 231 rotatively mounted within and passing through the wall of the drill head, this stud being in axial alignment with the plunger and cylinder of the valve. A hand lever 232 has its end engaged over and fixed to the extended end of the stud portion by means of a pin 233. Thus, the lever 232 is accessible at the outside of the drill head and is designed to be moved to two positions, namely, "off" and "on." Appropriate stops (not shown) are provided for limiting the range of movement of the lever to these two positions. In the "off" position, the hydraulic interlock is not effective, whereas, in "on" position, the clamps are automatically set when power is applied for translating the drill spindle. The cup-shaped end of the member 229 is fixed to the end of the sleeve 227 by means of a set screw 234.

The plunger 105 is moved translatably relative to ports in the sleeve 227. For a clear understanding of the structure of the plunger and the arrangement of the ports, reference should be made to Figures 20-28 inclusive. The pump is connected to this valve by means of a conduit 235 (Figures 11 and 20). Appropriate fittings 236 connect this conduit to a tap hole 237 on the underside of the valve body 220. The exhaust or discharge pipe 238 connects the valve body 220 to the sump 239a which contains the pump 239 (Figure 11). This latter pipe connects above the sump and the oil flows down by gravity for recirculation by the pump. The pump circuit will be more fully described later. The exhaust pipe 238 connects to a tap hole 240 at the side of the pump body 220 through appropriate fittings 241. The fluid is delivered from the valve to the clamp cylinders by way of the fittings 214 and 215, and the pipes 135 and 211 previously described. The fitting 214 connects to a tap hole 242 at the top of the valve body extending through a clearance hole 243 in the support bracket 221 (Figure 17). All three of these tap holes, namely, 237 for the pump, 240 for the discharge, and 242 for the supply, enter the bore of the body 220 for cooperation with annular grooves formed in the outer surface of the cylinder 227.

The valve plunger 105 includes a relatively wide annular groove 245 and it is by way of the space created by this groove that the oil passes through the valve under the control of the plunger 105 and cylinder 227. The cylinder includes three annular grooves 246, 247 and 248. Grooves 246 and 248 do not extend entirely around the sleeve and the purpose of this will be evident from the description of operation later given. The intermediate groove 247 extends entirely around the cylinder or sleeve but includes a lateral passageway 249 which connects it to the area of the groove 248 transversely of the axis of the plunger (Figure 23). This lateral portion 249 terminates within the cylinder body between the ends of the groove 248. All of the grooves are connected to the bore of the sleeve or cylinder 227 by means of a plurality of radial apertures 250.

Figures 20–23 inclusive show the valve in position where the hydraulic interlock is effective, that is to say, the control handle 232 has been moved to "on" position for rotating the sleeve 227 relative to the plunger. Also these views show the plunger of the valve moved to effective position for setting the clamps, that is, as the power to the spindle is applied. Tracing the circuit of the oil with the valve in this position, the oil from the pump enters the tap hole 237. It is able to enter the annular groove 246 since the blanked-out portion of this groove is displaced. It flows from the annular groove 246 through the ports 250 into the wide annular groove 245 of the plunger which in this position straddles or overlaps the annular grooves 246 and 247. Therefore, the oil may flow lengthwise of the plunger out through the ports 250 into the annular groove 247 (Figure 22) and out to the clamping cylinders through the tap hole 242. This passage of the oil is clearly shown in Figures 21 and 22. At this point, discharge of the oil cannot take place since the annular groove 248, although connected to the discharge tap hole 240, is blocked by the body of the plunger.

When the power to the spindle is disconnected, the plunger is shifted to the right in the position shown in Figure 17. When this occurs, the annular groove 246 is blocked out by the plunger and there can be no supply of oil to the clamping cylinders. The discharge annular groove 248 is then connected to the intermediate annular groove 247 and the oil in the supply line is free to discharge to the sump by way of the annular groove 247, ports 250, wide annular groove 245, the annular exhaust groove 248 and thence through the exhaust or discharge tap hole 240 and the pipe 238 back to the sump.

Upon reference to Figures 24–27 inclusive, the operation of the valve when in the "off" position will be understood. Rotation of the cylinder 227 to "off" position brings the blocked-out portion of the groove 246 into position, closing the supply tap hole 237 (Figure 25). Therefore, it will be apparent that translation of the plunger will be ineffective for causing automatic clamping operations. The oil in the clamping cylinders may pass out through the discharge port in a different path from that followed when the valve is in "on" position. As indicated in Figures 26 and 27, the oil is free to discharge by way of the supply tap hole 242, the annular groove 247, the ports 250, the wide annular groove 245 of the plunger, the longitudinal extension 249 and then out through the discharge tap hole since this longitudinal extension now overlies the tap hole because of rotation of the sleeve 227.

Figures 20–23 inclusive depict the normal operation of the valve in the absence of the use of the throw-out feature. However, if the operator wishes to discontinue the use of the hydraulic interlock for any reason, the handle may be swung to "off" position no matter whether the plunger is in one position or the other. It is pointed out that the exhaust or discharge passage is always open with the lever in the "off" position, no matter what the position of the plunger may happen to be. Thus, the clamps may be operated manually if desired, that is to say, they are not frozen in position by blocking of the oil.

Description of operation

For an understanding of the general operation of the present apparatus, reference may be had to Figure 20. When the operator moves the lever 69 for translating the clutch operating sleeve 73 to throw in the clutch 55, the power is connected to the spindle sleeve 42 through the gears 52 and 54. This movement of the clutch sleeve operates the lever 92 for translating the piston plunger 105 of the main control valve 107.

The valve operation has been described in detail previously and it will be understood at this point that the oil flows from the pump through the main supply line or conduit 235 to the respective clamp operating cylinders by way of conduits 135 and 211 simultaneously. When the oil cannot flow to the clamp operating cylinders 129 and 199 respectively, it passes through a relief valve 251 and thence through a conduit 252 to the gear splash system and eventually to a tank 239a. An oil straining device 253 is inserted in this line. As stated, the oil is returned from the valve on the discharge side through a pipe 238 to the sump 239a.

It is not believed necessary to go into the details of the mechanical operation of the clamps since this has been previously described. Also as stated, the lever 232 is used for throwing the main valve between "on" and "off" positions as desired by the operator. In other words, the automatic interlock feature may be cut out if desired.

Having described our invention, we claim:

1. In a radial drill having an arm, a drill head, a spindle, a clutch for translating the spindle by power and a manually operated clutch lever for engaging and disengaging the clutch, a hydraulic system for automatically clamping the drill head to the arm when the drill spindle is clutched for power translation comprising, a hydraulic fluid reservoir disposed within the drill head, a power driven hydraulic pump mounted in the drill head, a hydraulic cylinder and piston assembly mounted within the drill head, a clamping device adapted to clamp the drill head to the arm, mechanical connecting means extending between the hydraulic piston and said clamping device, a hydraulic conduit extending from the said hydraulic pump to the said hydraulic cylinder and piston assembly, a control valve interposed in the said hydraulic conduit to regulate the operation of the said piston, a valve control lever extending from the said manually operated clutch to the hydraulic control valve, the valve control lever being arranged to actuate the valve to admit fluid pressure to the hydraulic cylinder and piston assembly upon manual actuation of the clutch lever to cause clamping of the drill head to the arm automatically when the spindle is translated by power.

2. In a radial drill having an arm, a drill head translatably mounted on the arm, a power translated spindle mounted within the drill head, and a clutch having a manually operated lever for controlling power translation of the spindle, a hydraulic system for clamping the drill head to the arm when the clutch is engaged to translate the spindle by power comprising, an oil reservoir disposed within the drill head, a power driven pump disposed within the reservoir, a control valve mounted within the reservoir, the said control valve including a rotatable sleeve having an on and off position and being constructed and arranged to render the hydraulic system operative or inoperative upon rotation of the sleeve, a hand operated valve control lever for rotating said sleeve extending through the wall of the drill head, a slidable plunger disposed within the said rotatable sleeve having an end connected to the clutch and adapted to be shifted longitudinally with respect to the rotatable sleeve, upon operation of the clutch, the said valve being constructed and arranged to apply fluid pressure automatically to the cylinder to clamp the drill head to the arm when the said clutch is manually engaged and being adapted to relieve the hydraulic pressure when the clutch is disengaged when the said valve control lever is in on position, the shifting of the said slidable plunger being inoperative to cause the said automatic clamping of the drill head when the said hand operated valve control lever is shifted to off position.

3. In a radial drill having an arm, a head, a translatable drill spindle and a clutch having a manually operated clutch collar adapted to couple the drill spindle to a power transmission for translating the same, a hydraulic system for clamping the drill head to the arm automatically when the spindle of the drill head is coupled for power translation comprising, a housing for the drill head constituting a hydraulic fluid reservoir, a hydraulic pump mounted in the reservoir, a wedging shoe interposed between the drill head and arm adapted to clamp the head to the arm, a shaft having an end in screwthreaded engagement with the said wedging shoe, an arm secured to said shaft and adapted to rotate the shaft and to engage and disengage the shoe with respect to the arm, a hydraulic cylinder having a piston connected to the end of said arm for actuating the clamping shoe, a control valve connected to the said cylinder and adapted to admit hydraulic pressure from the said hydraulic pump to the cylinder for operating the clamping shoe, a lever pivotally mounted within the drill head having one end operatively connected to the control valve and having its opposite end connected to the said manually operated clutch collar, the said valve being constructed and arranged to apply fluid pressure to the hydraulic cylinder to clamp the head automatically when the manually operated clutch lever is shifted to spindle translating position and to unclamp the head when the lever is shifted to its clutch disengaging position.

4. In a radial drill having a base, a column, a column clamp, an arm, a drill head slidably mounted on the arm, a power translated spindle mounted in the drill head, and a manually operated spindle clutch for controlling translation of the spindle, a hydraulic system for simultaneously clamping the column to the base when the said clutch is engaged for power translation of the spindle comprising, an arm shaft extending along the arm, a column shaft extending along the column, means connecting said shafts for unitary rotation, means connecting the column shaft to the column clamp, a hydraulic column clamp actuating cylinder mounted within the drill head, an arm slidably keyed to the said arm shaft, a plunger within the cylinder having its end connected to said arm for rocking said shaft, a source of hydraulic pressure, a control valve having a slidable plunger interconnected mechanically with the spindle clutch, the said control valve plunger having ports constructed and arranged to apply fluid pressure to the column clamp cylinder upon engagement of said clutch to clamp the column automatically when the drill spindle is translated by power.

CARL E. LINDEN.
FRANK O. WETZEL.

REFERENCES CITED

The following references are of record in the file of this patent:

UNITED STATES PATENTS

| Number | Name | Date |
|---|---|---|
| 1,979,473 | Klausmeyer | Nov. 6, 1934 |
| 2,050,520 | Carter | Aug. 11, 1936 |
| 2,319,551 | Linden et al. | May 18, 1943 |

FOREIGN PATENTS

| Number | Country | Date |
|---|---|---|
| 198,716 | Great Britain | June 13, 1923 |